Jan. 12, 1932.   P. TORCHIO   1,841,320
ELECTRIC CABLE
Original Filed June 25, 1925   3 Sheets-Sheet 1
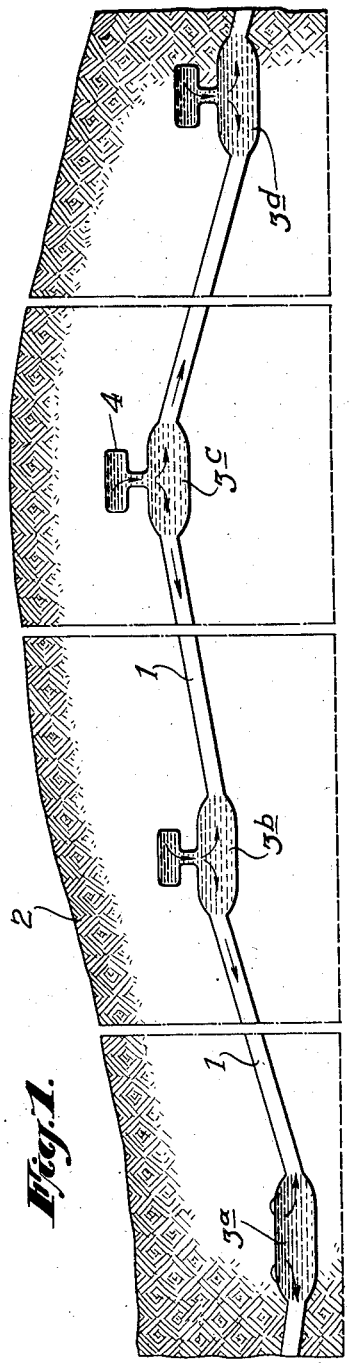
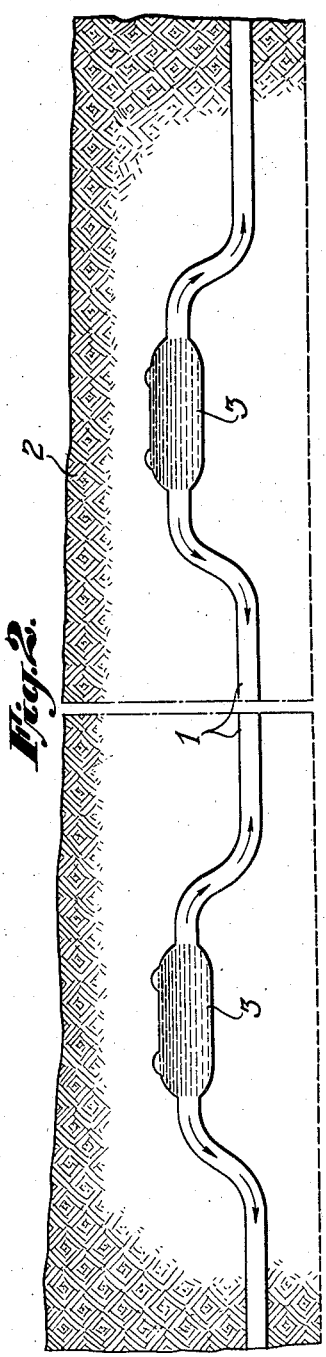
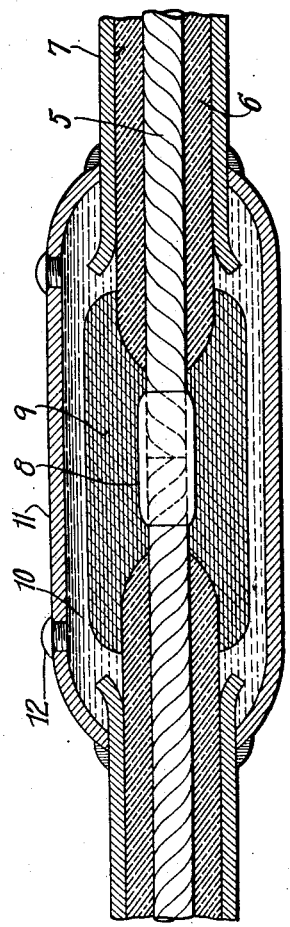
Inventor
PHILIP TORCHIO.

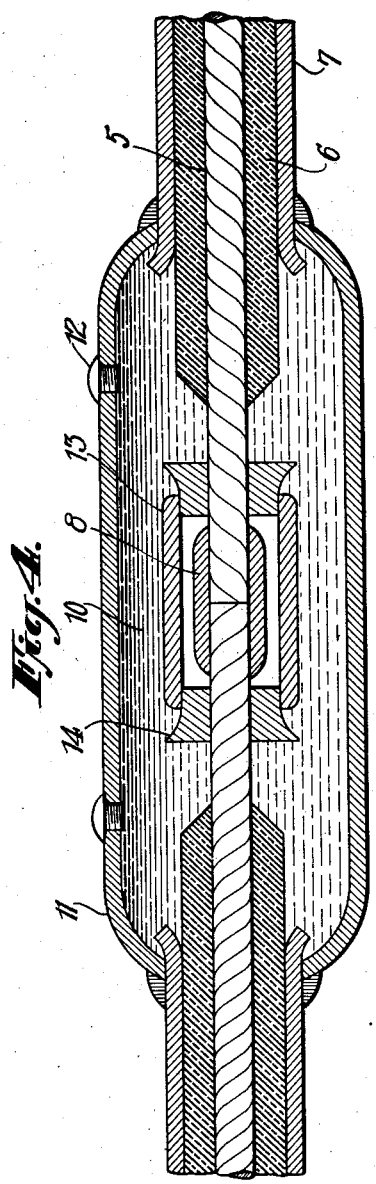
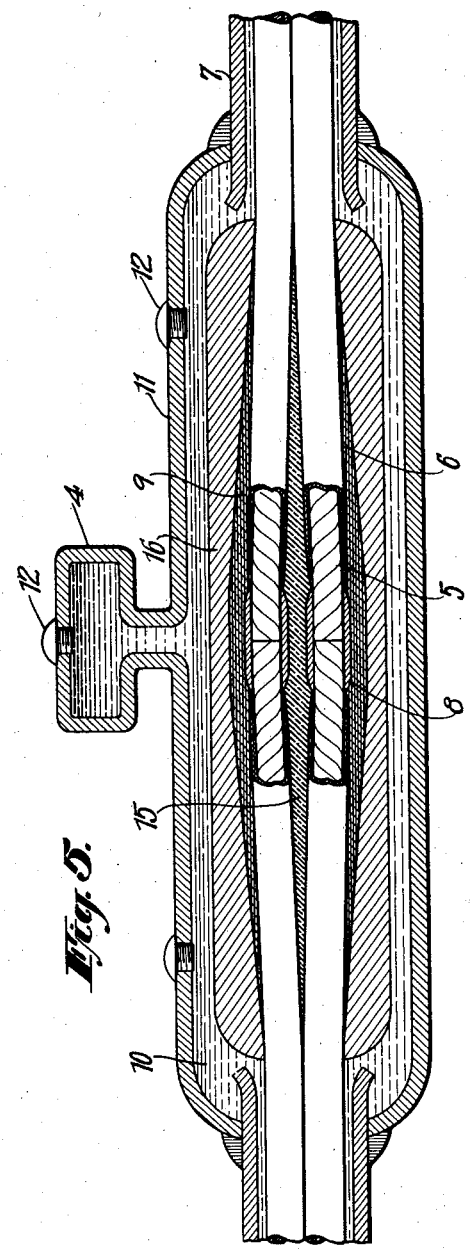

Jan. 12, 1932. P. TORCHIO 1,841,320
ELECTRIC CABLE
Original Filed June 25, 1925 3 Sheets-Sheet 3
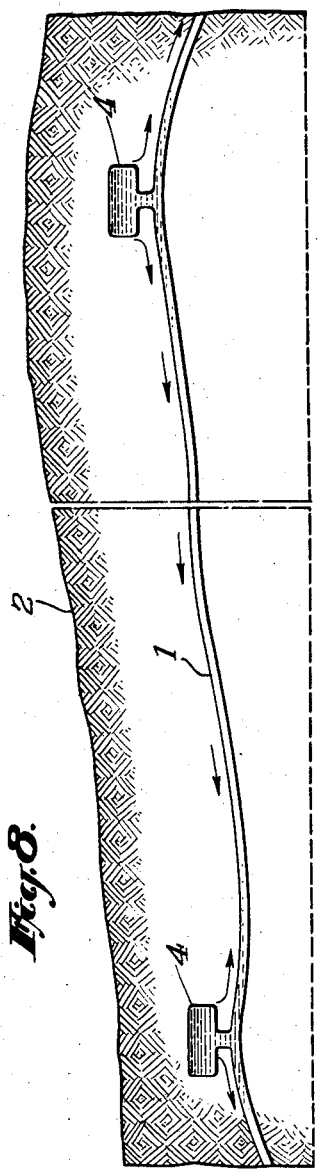
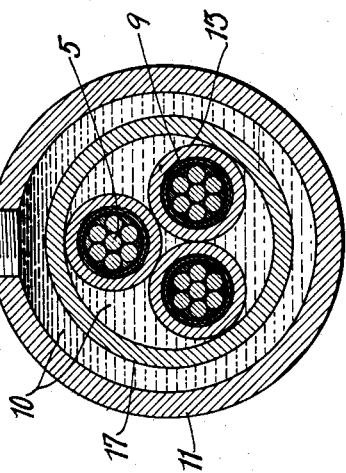
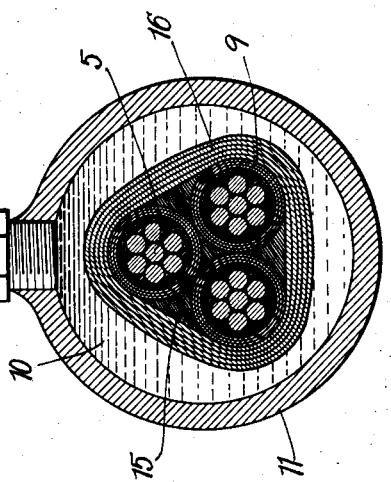
Inventor
PHILIP TORCHIO.
By His Attorney Patented Jan. 12, 1932

1,841,320

UNITED STATES PATENT OFFICE

PHILIP TORCHIO, OF LAWRENCE PARK, BRONXVILLE, NEW YORK

ELECTRIC CABLE

Application filed June 25, 1925, Serial No. 39,439. Renewed July 15, 1931.

In my Patent No. 1,172,322 I have described a joint for electric cables surrounded by a lead sheath containing insulating oil or similar liquid.

I have discovered that by the use of a sufficiently light oil, one which flows more easily than the fluids generally used for impregnation of cables by manufacturers, and by taking advantage of gravity or by the use of artificial pressure, I can maintain the insulation in good condition not only at the joint but also for considerable distances beyond the joint. In fact the joints may be at such distances and the cable of such construction and laid along such grades as to permit the passage of the oil and the maintenance of the insulation throughout practically the entire length.

The accompanying drawings illustrate an embodiment of the invention.

Fig. 1 is a diagrammatic elevation of an underground cable with joints at different levels;

Fig. 2 is a similar view of a cable with joints at about the same level;

Figs. 3, 4 and 5 are longitudinal sections of different styles of joint.

Figs. 6 and 7 are cross sections of different styles of joint.

Fig. 8 is a diagram illustrating a modification.

Referring to Fig. 1, the cable 1 follows approximately the level of the surface 2 of the ground. The sections of cable are joined, usually at manholes, by joints 3. To distinguish the different levels in Fig. 1, the joints are marked 3$^a$, 3$^b$ and so forth. On the upper side of each joint casing there is a reservoir 4 shown in Fig. 1. Or the casing at the joint may be made large enough to dispense with a separate reservoir.

The thin oil introduced at the joints permeates not only the insulating material but also the cable ends. It also enters the interstices between the strands of the usual stranded copper conductor and any interstices in the insulating material, and by capillarity and pressure, particularly where assisted by gravity, travels along the length of the conductor or conductors to a considerable distance beyond the joint. As the oil travels along the conductor, it permeates the surrounding insulation. The supply of oil at the joint is sufficient to make up any deficiency in the sleeve caused by the absorption and breathing of the cable, and also any deficiency in the cable beyond the joint caused either by inherent dry spots and wrinkles or by the breathing of the cable. This breathing is an expansion under increased load and temperature and a contraction which is incomplete in the surrounding insulation, leaving voids or wrinkles in the insulation, which results in a lowering of the dielectric strength of the insulation.

In such an installation as shown in Fig. 1 the oil introduced at the joints is fed by gravity from the higher levels to the lower. On such a line inspection of the joints has shown a necessity for refilling those at the higher levels, as 3$^b$ and 3$^c$ from time to time, but no necessity for refilling those at the lower levels as 3$^a$, this joint and the adjacent portions of the cable being kept full by pressure from the higher reservoirs. There is in fact no need for a reservoir such as 4 on this lowest joint and even the lead sheath around it does not need to be large enough to carry any substantial surplus of oil.

The refilling of the reservoirs or receptacles at the higher joints from time to time thus maintains an excess of oil and keeps the entire cable including the joints at lower levels in good condition. The supply of oil to the new cable is of great importance because in the handling and laying thereof the insulating oil applied at the factory is apt to migrate from certain parts and to leave voids; and because voids and wrinkles are produced to some extent in original faulty wrapping and in bending of the cable as laid. And the replenishment of the oil supply through the joints is important in filling the voids and supplying the deficiencies created by migration and breathing which take place during use of the cable. By my method of supplying and maintaining oil, failures from improper insulation are eliminated between the joints as well as at the joints.

Fig. 2 shows the invention applied to a cable 1 which is practically level, the joints 3 being elevated above the intermediate portions of the cable so that the oil supply maintained in the joint sleeves will flow by gravity to the intermediate parts of the cable. No separate reservoirs are shown for the joint sleeves in this figure, the sleeves being large enough to carry the required reserve of oil.

The joints illustrated in detail are of known types. The invention may be applied to cables and joints of these and of various other styles. In Fig. 3 a stranded conductor is shown at 5 surrounded by factory insulation 6 and a lead or other metallic sheath 7. The bared ends of the cable are wrapped in a connector 8 and a wrapping 9 of paper or cambric about which is the supply of oil 10 in the lead or other metal sleeve 11. The oil is introduced through holes in the sleeve which are afterwards closed by plugs 12. Any suitable apparatus may be used for introducing the oil under sufficient pressure to secure the desired initial distribution of it; after which a mere refilling from time to time will serve the desired purpose as above stated.

According to Fig. 4 the bared ends of the cable held within the connector 8 are surrounded by a tube 13 of paper or mica closed at the ends by spacing blocks 14 of conical shape.

According to Fig. 5 there are three conductors 5 in the cable. They are separately connected at their bared ends by connectors 8, separated by a filler 15 of paper or jute and surrounded by a wrapping 9 of paper or cambric and a second wrapping 16 and then by the oil 10 in the lead sleeve 11 which is surmounted by a separate reservoir 4. An extra supply of oil is desirable in a case, like this, where a joint is made in a three-conductor cable.

Figs. 6 and 7 are cross-sections through joints of different types for three-conductor cables. The cables 5 are of the usual seven strands laid up in spirals. Between the usually circular strands there are spiral interstitial spaces constituting channels running the full length of the conductor and affording passages for the flow of the oil. According to Fig. 6 each conductor is surrounded by a wrapping of paper or cambric 9, the spaces between the conductors are filled with a filler 15 of paper or jute, and a second wrapping 16 of paper or cambric is arranged around the three conductors.

According to Fig. 7 each conductor 5 is carried in a wrapping 9 and in a separate joint tube 13 of paper or mica, and the three conductors together are enclosed in a larger tube 17 of similar material. The oil 10 fills the space within the tube 17 as well as that within the outer shell 11.

It will be seen from the above description that the invention is applicable to cables of one or more electric conductors and to cables with wrappings and sheaths of various materials and designs. The very light oil proposed will travel great distances. The shell of the joint will generally be of lead hermetically sealed at both ends to the lead sheath of the cable. It may be of other materials and construction, however, as long as it will prevent the escape of the oil. It may be made with its inner diameter only great enough to fit the outer diameter of the wrapped joint, or it may have a clear space for a reserve or excess of oil or may carry an extra oil reservoir as above explained.

Different designs and arrangements involving the invention may be adopted according to the profile of the route of the cable run. But in all cases the layout is best designed to provide sufficient total passageway along the cable and a sufficient quantity of oil of the required fluidity at the joints to flow into such passageways, to be absorbed by the insulation and to fill the wrinkles, voids and clearances existing in the cable as laid and occurring in its use.

The invention is most readily applied to existing cable systems at joints in the cable. But the thin insulating liquid may also be introduced where there is no break in the continuity of the conductor. It is only necessary to make a hole through the sheath and introduce a thin insulating oil in such volume and under such circumstances of gravity or artificial pressure as will cause it to flow into the interstitial spaces and to travel along the conductor to a point where a supply of such oil is maintained from another point of introduction. Fig. 8, for example, shows a theoretical line of cable 1 without joints but with reservoirs 4 at high points which feed oil continuously in both directions by gravity.

The oil used should have practically no viscosity, or so little as not to interfere with its flowing easily along the cable. An example of an oil which I have used with success is oil having a density at ordinary temperatures of about .870.

Various modifications may be made by those skilled in the art without departing from the invention as defined in the following claims.

What I claim is:

1. An electric conductor comprising a cable made of strands laid in contact with each other between which are spiral interstitial spaces, said cable having a pervious wrapping applied directly and closely to the cable without any intervening space except such as may be due to the shape of the strands, such wrapping being impregnated with an insulating filling compound, an impervious outer sheath closely fitting said pervious wrapping, an insulating liquid in communication with the interstitial spaces of the cable and of the pervious wrapping, and means for carrying an excess of such liquid said liquid being more fluid than the compound used for impregnation of the pervious wrapping and so fluid as to travel along such interstitial spaces and to enter any voids in the insulation.

2. An electric conductor comprising a cable made of strands laid in contact with each other between which are spiral interstitial spaces, said cable having a pervious wrapping applied directly and closely to the cable without any intervening space except such as may be due to the shape of the strands, such wrapping being impregnated with an insulating filling compound, an impervious outer sheath closely fitting said pervious wrapping, an insulating liquid consisting of oil with a density at ordinary temperatures of about 0.870 in communication with the interstitial spaces of the cable and of the pervious wrapping, and means for carrying an excess of such liquid, said liquid being more fluid than the compound used for impregnation of the pervious wrapping and so fluid as to travel along such interstitial spaces and to enter any voids in the insulation.

In witness whereof, I have hereunto signed my name.

PHILIP TORCHIO.